US012637100B2

(12) United States Patent
Sumner et al.

(10) Patent No.: US 12,637,100 B2
(45) Date of Patent: May 26, 2026

(54) BUILDING THE TRUST OF A VEHICLE OCCUPANT IN AN AUTOMATED VEHICLE FUNCTION

(71) Applicant: Toyota Research Institute, Inc., Los Altos, CA (US)

(72) Inventors: Emily Sarah Sumner, Cambridge, MA (US); Guy Rosman, Cambridge, MA (US); Xinyue Hu, Irvine, CA (US); Jonathan A. DeCastro, Arlington, MA (US); Andrew Michael Silva, Cambridge, MA (US); Deepak Edakkattil Gopinath, Washington, DC (US); Thomas M. Balch, Damariscotta, ME (US); Xiongyi Cui, Somerville, MA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 32 days.

(21) Appl. No.: 18/929,848

(22) Filed: Oct. 29, 2024

(65) Prior Publication Data

US 2026/0116412 A1 Apr. 30, 2026

(51) Int. Cl.
*B60W 50/14* (2020.01)
*B60W 40/08* (2012.01)
(Continued)

(52) U.S. Cl.
CPC ............ *B60W 50/14* (2013.01); *B60W 40/08* (2013.01); *B60W 60/0055* (2020.02);
(Continued)

(58) Field of Classification Search
None
See application file for complete search history.

(56) References Cited

U.S. PATENT DOCUMENTS 10,372,130 B1 * 8/2019 Kaushansky .......... B60K 35/26
10,562,542 B1 2/2020 Shannon et al.
(Continued)

FOREIGN PATENT DOCUMENTS

DE 102006052898 A1 12/2022
DE 102022129911 A1 5/2024

OTHER PUBLICATIONS

Esterwood et al., "The theory of mind and human-robot trust repair," Scientific Reports, 2023, 15 pages.
(Continued)

*Primary Examiner* — Muhammad Adnan
(74) *Attorney, Agent, or Firm* — Christopher G. Darrow; Darrow Mustafa PC

(57) ABSTRACT

Systems, methods, and other embodiments described herein relate to building the trust of an occupant in an automated vehicle function. In one embodiment, a method for buildling the trust includes acquiring trust data regarding an automated function of a vehicle, an external environment of the vehicle, and an occupant of the vehicle. The method also includes processing the trust data to determine a baseline trust of the occupant in the automated function executing an action for the vehicle. The method also includes identifying a trust level of the occupant. The method further includes determining, based, at least in part, on the trust data and in response to identifying that the trust level satisfies a threshold, a trust message and a content type and a delivery type of the trust message. The method further includes delivering the trust message to the occupant.

20 Claims, 6 Drawing Sheets

(51) Int. Cl.
    *B60W 50/00*     (2006.01)
    *B60W 60/00*     (2020.01)

(52) U.S. Cl.
    CPC ............... *B60W 2050/0083* (2013.01); *B60W 2050/143* (2013.01); *B60W 2540/221* (2020.02)

(56)       References Cited

U.S. PATENT DOCUMENTS

| | | | | |
|---|---|---|---|---|
| 10,875,545 | B2* | 12/2020 | Iwamoto | ............... B60W 40/09 |
| 11,625,036 | B2 | 4/2023 | Halder | |
| 2018/0267558 | A1* | 9/2018 | Tiwari | ................... H04N 23/90 |
| 2020/0180640 | A1* | 6/2020 | Luders | ........... B60W 30/18009 |
| 2020/0361452 | A1* | 11/2020 | McGill | ............... B60W 50/045 |
| 2020/0402658 | A1 | 12/2020 | Tomsett et al. | |
| 2021/0125431 | A1* | 4/2021 | Mcgill | ................. G01S 13/867 |
| 2021/0197808 | A1* | 7/2021 | Maeda | ................. B60W 40/04 |
| 2022/0230081 | A1 | 7/2022 | Goldman-Shenhar | |
| 2022/0281461 | A1 | 9/2022 | Gentner | |
| 2022/0388543 | A1* | 12/2022 | David | ............ B60W 30/18163 |
| 2022/0396287 | A1* | 12/2022 | Akash | ................... B60W 50/16 |
| 2024/0149923 | A1* | 5/2024 | Fang | ...................... G06V 20/56 |

OTHER PUBLICATIONS

Manchon et al., "Calibration of trust in automated driving: a matter of initial level of trust and automated driving style?," Human Factors, 2023, 32 pages.

Martelaro et al., "Tell me more: designing HRI to encourage more trust, disclosure, and companionship," 11th ACM/IEEE International Conference on Human-Robot Interaction (HRI), 2016, 8 pages.

Sebo et al., "The ripple effects of vulnerability: the effects of a robot's vulnerable behavior on trust in human-robot teams," Association for Computing Machinery, 2018, 9 pages.

Sumner et al., "Personalizing driver safety interfaces via driver cognitive factors inference," Scientific Reports, 2024, 12 pages.

\* cited by examiner

BUILDING THE TRUST OF A VEHICLE OCCUPANT IN AN AUTOMATED VEHICLE FUNCTION

TECHNICAL FIELD

The subject matter described herein relates, in general, to relations between occupants and vehicles and, more particularly, to building the trust of a vehicle occupant in an automated vehicle function.

BACKGROUND

In some instances, an occupant of a vehicle may have a certain level of trust in the operation of the vehicle, including different automated systems. For example, the occupant should trust that the vehicle will sense the environment in which the vehicle operates and, based on the surroundings, make driving decisions (e.g., perform automated vehicle functions) that will get the occupant to the destination, keep the occupant safe, and prevent accidents. However, in some instances, the occupant may lose trust in the automated function. Loss of trust may occur in various instances, for example, when the vehicle does not obey street signs, when a near collision occurs, or even when the occupant becomes uneasy traveling in the vehicle. When an occupant loses trust in automated vehicle functions, the occupant may become stressed out or worried, or the occupant may try to regain control of the vehicle. In either case, loss of trust can result in a trip in the vehicle that is uncomfortable for the passenger, or, among other negative consequences, loss of trust can cause dangerous takeover instances between the occupant and the vehicle.

SUMMARY

Example systems and methods relate to a manner of building the trust of an occupant of a vehicle in one or more automated functions of the vehicle. As previously noted, in some instances, the occupant may lose trust in automated vehicle functions, for example, if the vehicle does not obey street signs, if a near collision occurs, or even if the occupant becomes uneasy traveling in the vehicle. As a result, the occupant may become stressed, resulting in an unpleasant trip for the occupant, or the occupant may try to regain control of the vehicle, resulting in a dangerous driving scenario. Accordingly, a trust system for a vehicle is configured to identify a baseline trust level of an occupant in the operation of a vehicle, monitor for instances in which the baseline trust level may decrease, resulting in a need for trust building, and determine a message to be delivered by the vehicle to the occupant in an attempt to build the trust. The message can have various attributes, including the content of the message and the manner in which the message is delivered, that may be tailored to the occupant, resulting in a more successful attempt to build trust. Accordingly, the systems and methods disclosed herein provide the benefit of building the trust of an occupant in automated functions of a vehicle, thereby making a trip in the vehicle safer and more comfortable for the occupant.

In one embodiment, a system is disclosed. The system includes a processor and a memory communicably coupled to the processor and storing a trust module including instructions that, when executed by the processor, cause the processor to acquire trust data regarding an automated function of a vehicle, an external environment of the vehicle, and an occupant of the vehicle. The instructions also include instructions to process the trust data to determine a baseline trust of the occupant in the automated function executing an action for the vehicle. The instructions also include instructions to identify a trust level of the occupant. The instructions further include instructions to determine, based, at least in part, on the trust data and in response to identifying that the trust level satisfies an action threshold, a trust message and a content type and a delivery type of the trust message. The instructions further include instructions to deliver the trust message to the occupant.

In one embodiment, a non-transitory computer-readable medium is disclosed. The non-transitory computer-readable medium includes instructions that, when executed by a processor, cause the processor to acquire trust data regarding an automated function of a vehicle, an external environment of the vehicle, and an occupant of the vehicle. The instructions also include instructions to process the trust data to determine a baseline trust of the occupant in the automated function executing an action for the vehicle. The instructions also include instructions to identify a trust level of the occupant. The instructions further include instructions to determine, based, at least in part, on the trust data and in response to identifying that the trust level satisfies a threshold, a trust message and a content type and a delivery type of the trust message. The instructions further include instructions to deliver the trust message to the occupant.

In one embodiment, a method is disclosed. The method includes acquiring trust data regarding an automated function of a vehicle, an external environment of the vehicle, and an occupant of the vehicle. The method also includes processing the trust data to determine a baseline trust of the occupant in the automated function executing an action for the vehicle. The method also includes identifying a trust level of the occupant. The method further includes determining, based, at least in part, on the trust data and in response to identifying that the trust level satisfies a threshold, a trust message and a content type and a delivery type of the trust message. The method further includes delivering the trust message to the occupant.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with building trust of occupants of a vehicle in an automated function are disclosed herein. As mentioned above, in some instances, an occupant of an automated vehicle may lose trust in automated functions of the vehicle. As a result, the occupant may become stressed, resulting in an unpleasant trip for the occupant, or the occupant may try to regain control of the vehicle, resulting in a dangerous driving scenario. Accordingly, a trust system for a vehicle is configured to identify a baseline trust of an occupant in an automated vehicle function, monitor for instances in which a need for trust building exists, and determine a message to be delivered by the vehicle to the occupant in an attempt to build the trust. The trust system can generate the message with various attributes, including the content of the message and the manner in which the message is delivered, which may include customization for the occupant, resulting in a more successful attempt to build trust. Accordingly, the systems and methods disclosed herein provide the benefit of building the trust of an occupant in automated functions of a vehicle, thereby making a trip in the vehicle safer and more comfortable.

Figure 1:
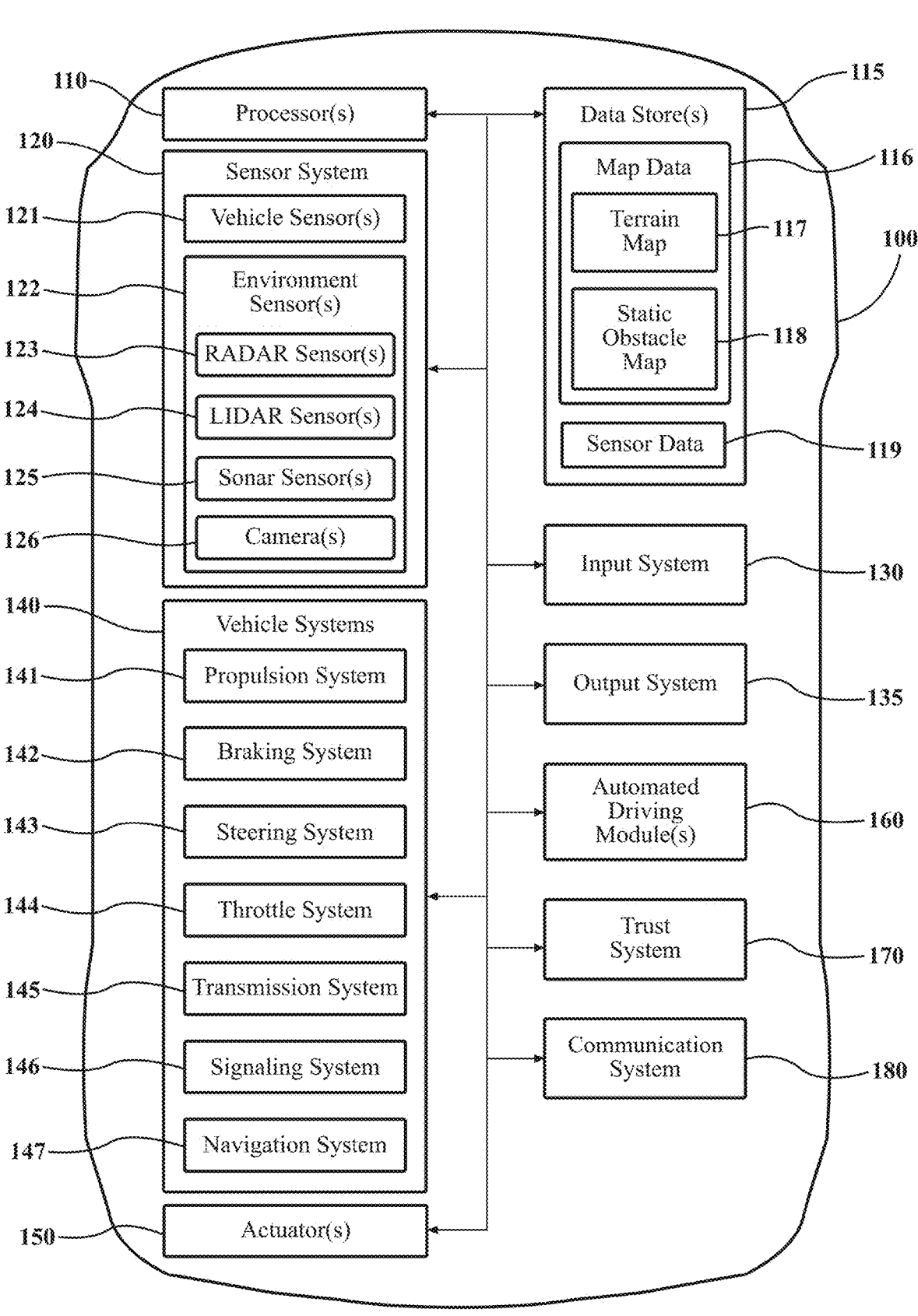
FIG. 1 illustrates one example of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be another form of motorized transport that may be human-operated or otherwise interface with human passengers.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within the vehicle 100 while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a trust system 170 that is implemented to perform methods and other functions disclosed herein relating to building the trust of occupant(s) of the vehicle 100 in one or more automated functions of the vehicle 100. As will be discussed in greater detail subsequently, the trust system 170, in various embodiments, is implemented partially within the vehicle 100 and as a cloud-based service. For example, in one approach, functionality associated with at least one module of the trust system 170 is implemented within the vehicle 100 while further functionality is implemented within a cloud-based computing system. Thus, the trust system 170 may include a local instance at the vehicle 100 and a remote instance that functions within the cloud-based environment.

Moreover, the trust system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a Wi-Fi, DSRC, V2I, V2V, or another suitable protocol for communicating between the vehicle 100 and other entities in the cloud environment. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the trust system 170 can leverage various wireless communication technologies to provide communications to other entities, such as members of the cloud-computing environment.

Figure 2:
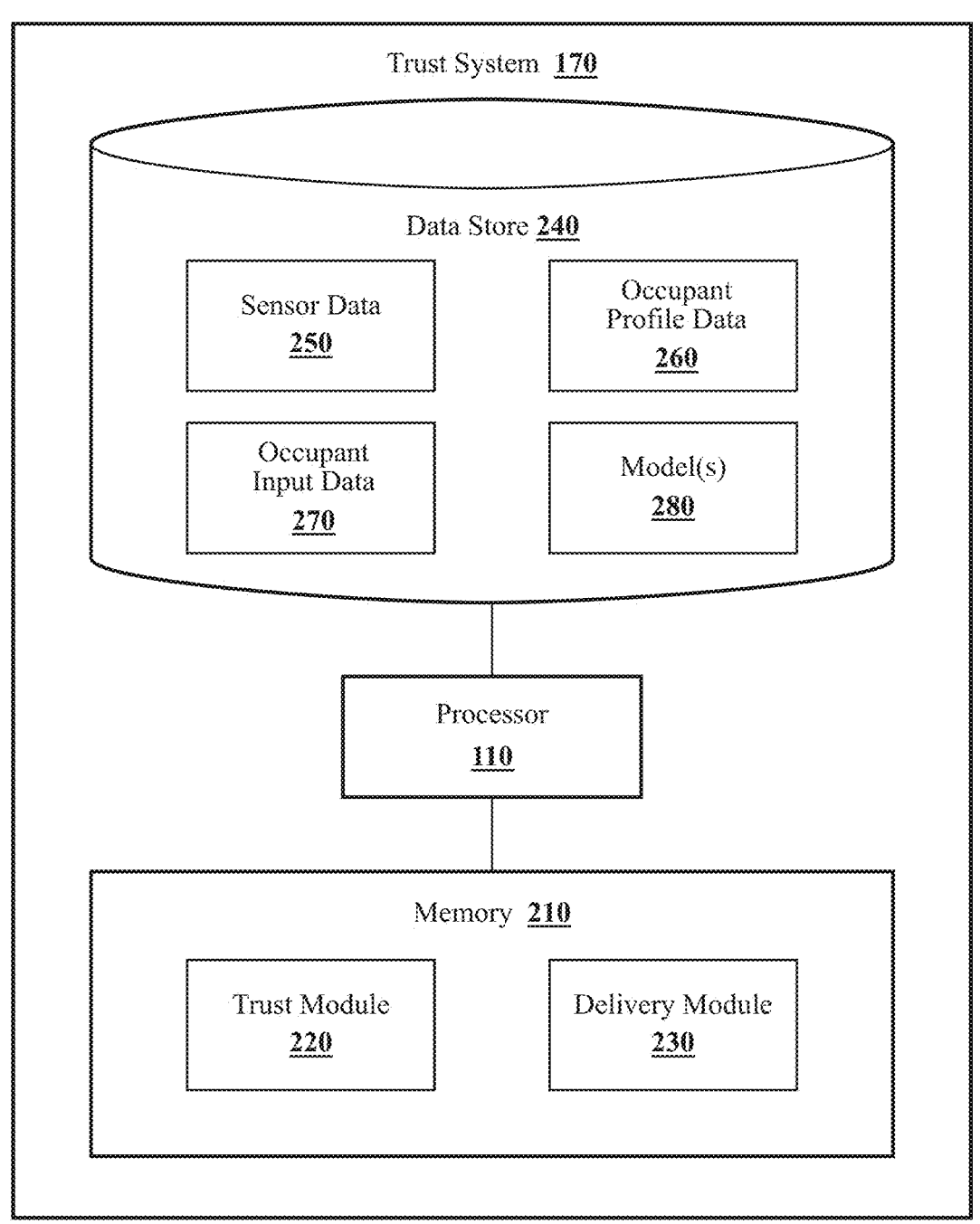
FIG. 2 illustrates one example of a system that is associated with trust building within occupant(s) of a vehicle.

With reference to FIG. 2, one embodiment of the trust system 170 of FIG. 1 is further illustrated. The trust system 170 is shown as including a processor 110 from the vehicle 100 of FIG. 1. Accordingly, the processor 110 may be a part of the trust system 170, the trust system 170 may include a separate processor from the processor 110 of the vehicle 100, or the trust system 170 may access the processor 110 through a data bus or another communication path. In one embodiment, the trust system 170 includes a memory 210 that stores a trust module 220 and a delivery module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein. In alternative arrangements, the modules 220 and 230 are independent elements from the memory 210 that are, for example, comprised of hardware elements. Thus, the modules 220 and 230 are alternatively ASICs, hardware-based controllers, a composition of logic gates, or another hardware-based solution.

Figure 3:
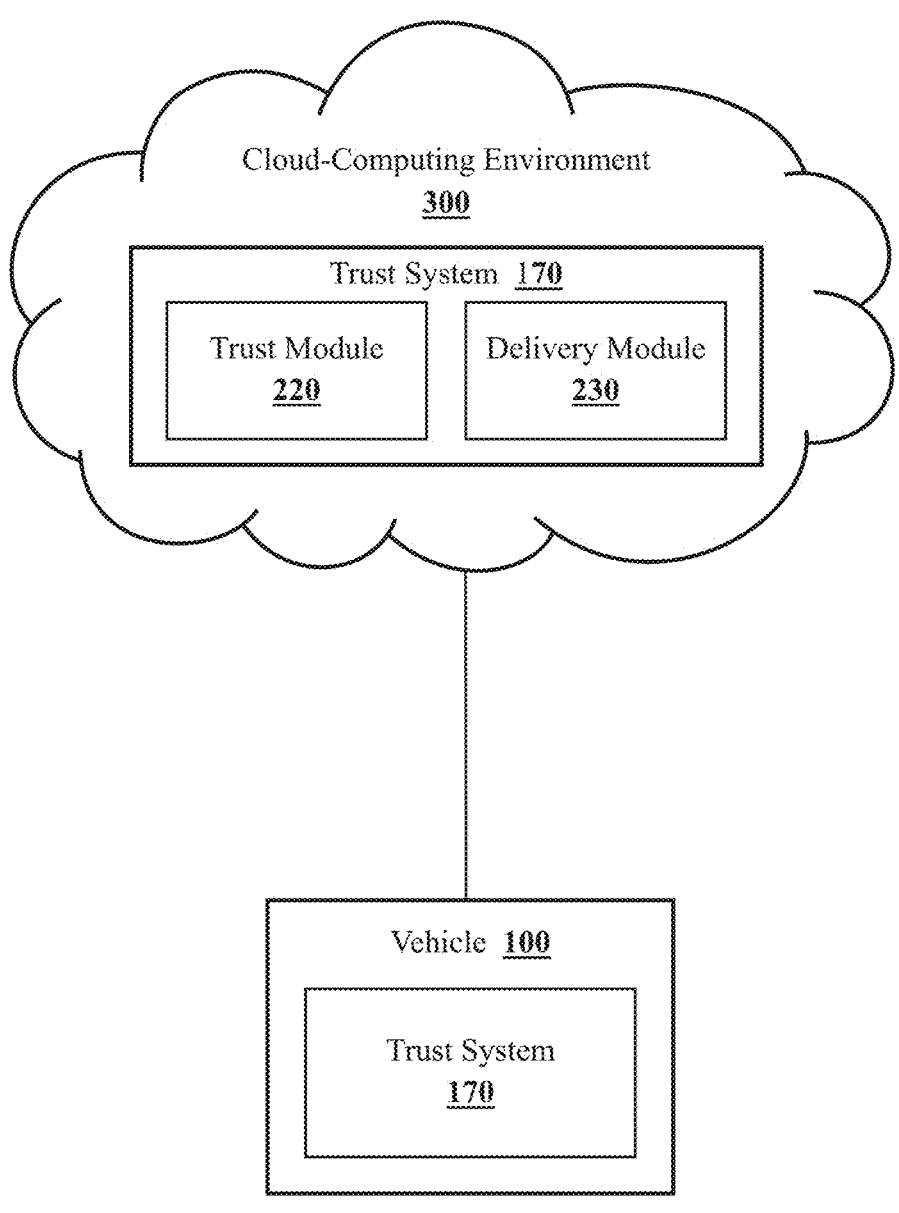
FIG. 3 illustrates one example of a trust system for a vehicle in a cloud-computing environment.

The trust system 170 as illustrated in FIG. 2 is generally an abstracted form of the trust system 170 as may be implemented between the vehicle 100 and a cloud-computing environment. FIG. 3 illustrates one example of a cloud-computing environment 300 that may be implemented along with the trust system 170. As illustrated in FIG. 3, the trust system 170 is embodied at least in part within the cloud-computing environment 300.

Accordingly, as shown, the trust system 170 may include separate instances within one or more entities of the cloud-based environment 300, such as servers, that may process information, for example, information received from the vehicle 100, and also instances within the vehicle 100 that function to receive the processed information, for example, a determination by a server after processing the information. In a further aspect, the entities that implement the trust system 170 within the cloud-based environment 300 may vary beyond transportation-related devices and encompass mobile devices (e.g., smartphones), and other devices that, for example, may be carried by an individual within a vehicle, and thereby can function in cooperation with the vehicle 100. Thus, the set of entities that function in coordination with the cloud environment 300 may be varied.

With continued reference to FIG. 2, in one embodiment, the trust system 170 includes a data store 240. The data store 240 is, in one embodiment, an electronic data structure stored in the memory 210 or another data store that is configured with routines that can be executed by the processor 110 for analyzing stored data, providing stored data, organizing stored data, and so on. Thus, in one embodiment, the data store 240 stores data used by the modules 220 and 230 in executing various functions. In one approach, the data includes trust data that the trust module 220 uses to make determinations of trust levels of the occupant(s) of the vehicle 100. Various types of trust data, including sensor data 250, occupant profile data 260, and occupant input data 270 will be described in further detail below. In any case, the data store 240 includes trust data along with, for example, metadata that characterize various aspects of the trust data. For example, the metadata can include location coordinates (e.g., longitude and latitude), relative map coordinates or tile identifiers, time/date stamps from when the separate trust data was generated, and so on. In one embodiment, the data store 240 stores the trust data. In one embodiment, as described in further detail below, the data store 240 also includes one or more model(s) 280 that may be leveraged to process the trust data.

As mentioned above, in one embodiment, the trust data includes sensor data 250, including observations of one or more objects in an external environment of the vehicle 100 and/or other aspects about the surroundings, perceptions from within a passenger compartment of the vehicle 100, and/or perceptions about the vehicle 100 itself, such as conditions of internal vehicle systems. The sensor data 250 may include various perceptions from sensors of a sensor system 120 of the vehicle 100. For example, the trust module 220 generally includes instructions that function to control the processor 110 to receive data inputs from one or more sensors of the vehicle 100. As provided for herein, the trust module 220, in one embodiment, acquires the sensor data 250 that includes at least perceptions of occupants within the vehicle 100, including, for example, a driver (e.g., in instances in which the vehicle 100 is a semi-autonomous vehicle) and passengers (e.g., in instances in which the vehicle 100 is a semi-autonomous vehicle or a fully autonomous vehicle). The trust module 220 may further acquire information from cameras 126 about surroundings of the vehicle 100, inertial measurement unit(s) about forces exerted on the vehicle 100, etc. In further arrangements, the trust module 220 acquires the sensor data 250 from further sensors such as a radar 123, a LiDAR 124, and other sensors as may be suitable for deriving a contextual understanding of the vehicle 100 and surroundings of the vehicle 100. Additionally, the trust module 220, when acquiring sensor data 250 from multiple sensors, fuses the sensor data 250 together to form the sensor data 250 and to provide for improved determinations of detection, location, and so on.

The trust module 220, in one embodiment, controls the sensors to acquire the sensor data 250 about an area that encompasses 360 degrees about the vehicle 100 in order to provide a comprehensive assessment of the environment. Of course, in alternative embodiments, the trust module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Accordingly, the trust module 220, in one embodiment, controls the respective sensors to provide the data inputs in the form of the sensor data 250. Additionally, while the trust module 220 is discussed as controlling the various sensors to provide the sensor data 250, in one or more embodiments, the trust module 220 can employ other techniques to acquire the sensor data 250 that are either active or passive. For example, the trust module 220 may passively sniff the sensor data 250 from a stream of electronic information provided by the various sensors to further components within the vehicle 100. Moreover, the trust module 220 can undertake various approaches to fuse data from multiple sensors when providing the sensor data 250 and/or from sensor data acquired over a wireless communication link (e.g., v2v) from one or more of the surrounding vehicles and/or the cloud-based environment 300. Thus, the sensor data 250, in one embodiment, represents a combination of perceptions acquired from multiple sensors and/or other sources. As part of controlling the sensors to acquire the sensor data 250, it is generally understood that the sensors acquire the sensor data 250 of a region around the vehicle 100 with data acquired from different types of sensors generally overlapping in order to provide for a comprehensive sampling of the external environment at each time step. In general, the sensor data 250 need not be of the exact same bounded region in the surrounding environment but should include a sufficient area of overlap such that distinct aspects of the area can be correlated.

In one approach, the trust module 220 implements and/or otherwise uses a machine learning algorithm, which may be one or more of the model(s) 280. In one configuration, the machine learning algorithm is embedded within the trust module 220, such as a convolutional neural network (CNN), to perform various perceptions approaches over the sensor data 250 from which further information is derived. Of course, in further aspects, the trust module 220 may employ different machine learning algorithms or implements different approaches for performing the machine perception, which can include deep neural networks (DNNs), recurrent neural networks (RNNs), or another form of machine learning. Whichever particular approach the trust module 220 implements, the trust module 220 provides various outputs from the information represented in the sensor data 250. In this way, the trust system 170 is able to process the sensor data 250 into contextual representations.

In some configurations, the trust system 170 implements one or more machine learning algorithms. As described herein, a machine learning algorithm includes but is not limited to deep neural networks (DNN), including transformer networks, convolutional neural networks, recurrent neural networks (RNN), etc., Support Vector Machines (SVM), clustering algorithms, Hidden Markov Models, etc. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the trust system 170 generally trains the machine learning algorithm according to a particular training approach, which may include supervised training, self-supervised training, reinforcement learning, and so on. In contrast to training/learning of the machine learning algorithm, the trust system 170 implements the machine learning algorithm to perform inference. Thus, the general use of the machine learning algorithm is described as inference.

In any case, as mentioned above, the trust data includes perceptions of occupants within the vehicle 100, which may be collected by the sensor system 120. However, in some instances, the trust data also includes data that is not collected by the sensor system 120. For example, the trust data includes occupant profile data 260 and/or occupant input data 270. Each of these types of data will now be described in further detail.

As mentioned above, in one approach, the sensor data 250 includes perceptions of the occupant(s) (e.g., occupant data). The occupant data, in one approach, includes biometric markers of the occupant(s). Biometric markers can be a strong indicator of the trust level of the occupant(s). The biometric markers include one or more of the following of the occupant(s): heart rate, temperature, facial expressions, facial movements, body movements such as fidgeting, age, gender, etc. As described in further detail below, the biometric markers can indicate the trust level of the occupant(s). For example, a high heart rate might indicate that an occupant is stressed, and therefore, that the occupant has lost trust in the automated vehicle function.

The biometric markers can also include markers related to the gaze of the occupant(s) (e.g., gaze markers). Like other biometric markers, gaze markers are a strong indicator of the trust level of the occupant(s). The gaze markers can include pupil size, eye movements, gaze duration, one or more gaze targets, etc. In one example, the trust module 220 identifies, using one or more cameras in a passenger compartment of the vehicle 100, an object, a place, or a region toward which the occupant(s) are looking, how long the occupant(s) look at that object, place, or region, how often the gaze of the occupant(s) changes, percentage of time that the occupant(s) are looking at the road, etc. For example, an occupant who is staring at the road for a long period of time might have a lowered trust level in the automated vehicle function, as this may indicate that the occupant is watching out for road hazards and/or closely monitoring the driving of the vehicle 100.

The occupant data may further include voice information about the occupant(s). Voice information can also be a strong indicator of the trust level of the occupant(s). For example, a single occupant of the vehicle 100 may make a statement or exclamation that may indicate the trust level of that occupant. As another example, two or more occupants of the vehicle 100 may have a conversation about the vehicle 100 that may indicate the trust level of each of the occupants individually, or a combined trust level of the group of occupants. The voice information can include speech, tone, syntax, prosody, posture, etc. Along with the gaze markers and biometric markers, the voice information can be collected by the sensor system 120.

Continuing with the sensor data 250, as mentioned above, the sensor data 250 also includes perceptions from within the passenger compartment (e.g., passenger compartment data). The passenger compartment data includes, for example, the number of occupant(s) in the vehicle 100, where the occupant(s) are located within the vehicle 100, temperature and light conditions within the vehicle 100, etc. The passenger compartment data can be useful in determining which occupant(s) are the target of trust building, where the trust building is to be directed, etc. This will be described in further detail below.

Moreover, as mentioned above, the sensor data 250 includes data about general aspects of the external environment of the vehicle 100. Accordingly, the sensor data 250 includes external environment data. The external environment data includes characteristics of surrounding objects, features, locations, and so on. More specifically, the environment data includes, for example, identifications of nearby vehicles, geographic features, current conditions such as weather conditions, and so on from the data that is collected. Moreover, as mentioned above, the sensor data 250 can include information about the vehicle 100 itself (e.g., vehicle data), including information about an automated function of the vehicle 100. In one approach, information about an automated vehicle function includes information regarding an automated driver assistance system (ADAS) of the vehicle 100, a lane keeping system of the vehicle 100, an adaptive cruise control system of the vehicle 100, etc. In some instances, the vehicle data is acquired via the sensor system 120. Additionally, vehicle data acquired through sensor system 120 can include the location of the vehicle 100 (for example, a map location of the vehicle 100), the heading of the vehicle 100, the speed of the vehicle 100, the rate of acceleration and/or braking of the vehicle 100, the distance between the vehicle 100 and nearby objects such as other vehicles, trees, road blocks, etc. In one approach, the trust module 220 leverages the external environment data and the vehicle data to identify when a need for trust building may exist, as described in further detail below. For example, a need for trust building may exist when the external environment indicates that a collision nearly occurred between the vehicle 100 and another vehicle or object.

In a similar manner, the trust module 220, via the sensor system 120, also acquires trust data regarding interactions between the occupant(s) and the vehicle 100. In other words, the sensor data 250 includes interaction data, which can indicate a trust level of an occupant. For example, an occupant who loses trust in the automated vehicle function may take over control of the vehicle 100. The interaction data can be retrieved from the data store 240, which may store the vehicle data. In one example, the interaction data includes data about the throttle and the brakes of the vehicle 100. More specifically, in one approach, the interaction data includes information about when the throttle and/or the brakes are engaged, how long the throttle and/or the brakes are engaged, etc. Additionally, the interaction data includes, in one embodiment, information about the steering wheel of the vehicle 100, for example, when an occupant touches the steering wheel, when the occupant engages the steering wheel to turn the vehicle, how much pressure the occupant applies to the steering wheel, etc. Moreover, in one embodiment, the interaction data includes historical data about occupant-vehicle interactions (e.g., historical interaction data). In one example, the historical interaction data includes how many times the occupant has taken over control of the vehicle 100, how frequently the occupant takes over control of the vehicle 100, common circumstances in which the occupant takes over control of the vehicle 100, etc.

As mentioned above, in one approach, the trust data also includes data that is not collected by the sensor system 120. In one embodiment, trust data includes occupant profile data 260. The occupant profile data 260 can include information about the occupant(s) including preferences set by the occupant(s) regarding one or more functions of the vehicle 100. For example, the occupant profile data 260 can include preferences on how the occupant prefers that the vehicle 100 communicates with that occupant. The occupant profile data 260 also includes, in one embodiment, historical data related to the occupant(s). The trust module 220, in one approach, uses the historical data related to the occupant(s) to continually improve trust building. The occupant profile data 260 will be described in further detail below.

Continuing with data that is not collected by the sensor system 120, in one embodiment, the data also includes occupant input data 270. The occupant input data 270 includes data that is input by the occupant(s) to an input system 130 (described in further detail below in connection with FIG. 1) of the vehicle 100. For example, the occupant input data 270 can include inputs from the occupant(s) to the input system 130. The inputs, in one embodiment, are self-reported trust levels of the occupant(s) in the operation of the vehicle 100. The occupant input data 270 will be described in further detail below.

Figure 4:
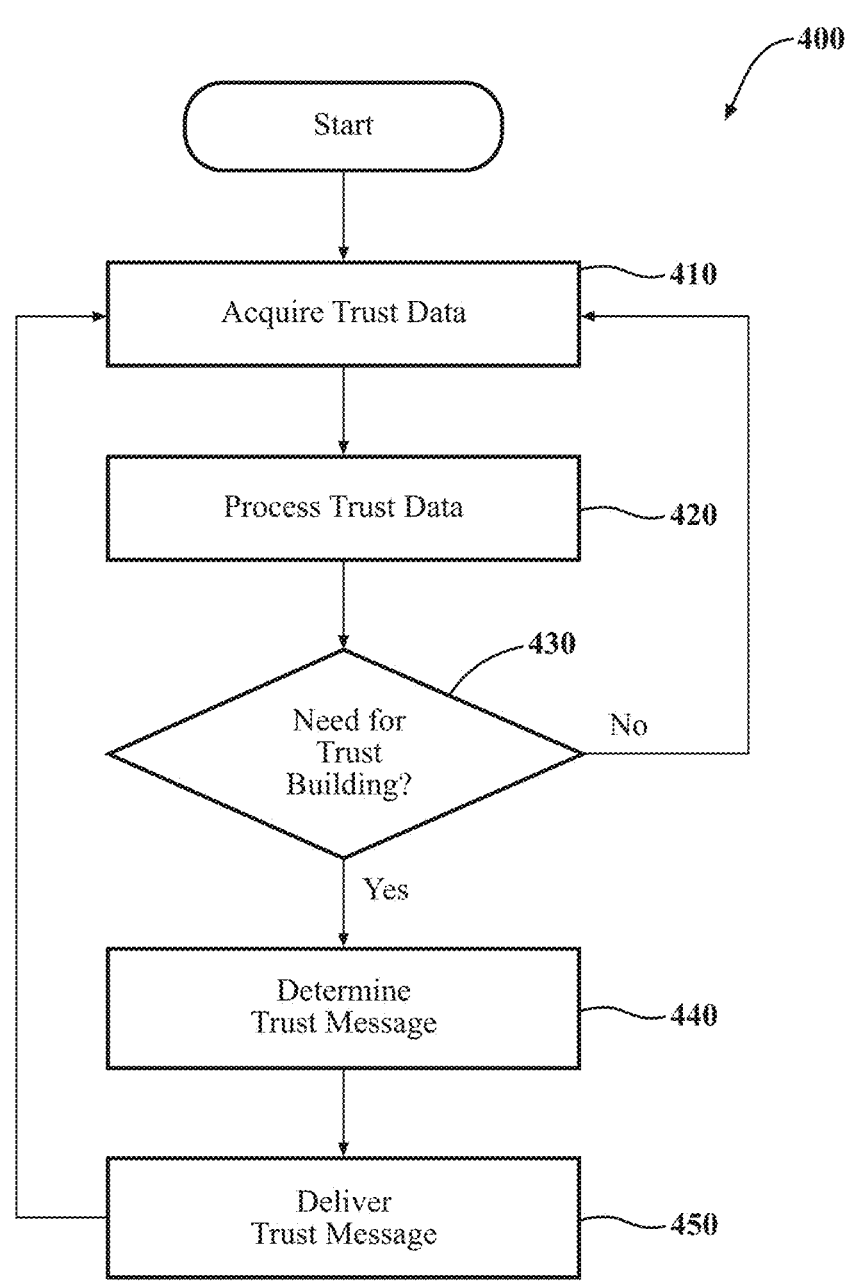
FIG. 4 illustrates a flowchart for one example of a method that is associated with building trust within occupant(s) of a vehicle.

Additional aspects of the trust system 170 will be discussed in relation to FIG. 4. FIG. 4 illustrates a flowchart of a method 400 that is associated with building the trust of one or more occupant(s) of the vehicle 100 in an automated function of the vehicle 100. Method 400 will be discussed from the perspective of the trust system 170 of FIGS. 1 and 2. While the method 400 is discussed in connection with the trust system 170, it should be appreciated that the method 400 is not limited to being implemented within the trust system 170 but that the trust system 170 is instead one example of a system that may implement the method 400.

At 410, the trust module 220 acquires the trust data. As described above, the trust data can include various types of data that may facilitate a determination, by the trust module 220, of a trust level of the occupant(s) in the automated vehicle function. In some embodiments, at 410, the trust module 220 acquires the trust data at successive iterations or time steps. Thus, the trust system 170, in one embodiment, iteratively executes the functions discussed at 410 to acquire trust data and provide information therefrom. Furthermore, the trust module 220, in one embodiment, executes one or more of the noted functions in parallel for separate observations in order to maintain updated perceptions.

With reference again to FIG. 4, in one approach, at 420, the trust module 220 processes the trust data, including the sensor data 250, the occupant profile data 260, and the occupant input data 270. In one approach, the trust module 220 leverages one or more models 280 of the trust system 170 to process the trust data. The model(s) 280 can include one or more of the models described above, for example, machine learning models, neural networks, etc. Use of the model(s) 280 will be described in further detail below.

In one approach, the trust module 220 processes the trust data to determine a baseline trust of the occupant in the automated function executing an action for the vehicle 100. In one approach, determining the baseline trust includes identifying trust data that includes a self-reported indication of the trust of the occupant, for example, through the input system 130. For example, upon entry into the vehicle 100, the input system 130 may prompt the occupant to enter an indication of his or her baseline trust. In some instances, the indication is entered on a numerical scale, by emoticons, by textual input, by voice input, etc.

In another approach, determining the baseline trust includes processing the trust data to determine an initial emotional state of the occupant(s) upon entry into the vehicle 100. The initial emotional state, in some instances, indicates the baseline trust. For example, an occupant who enters the vehicle 100 in a calm emotional state may have a high baseline trust. In another example, an occupant who enters the vehicle 100 in an anxious emotional state may have a low baseline trust. The emotional state can include one or more of the following positive emotional states: calm, happy, distracted, etc., and the emotional state can include one or more of the following negative emotional states: anxious, worried, scared, angry, concerned, etc. The trust module 220 can determine the emotional state of one or more occupants individually, or the trust module 220 can determine a group emotional state of multiple occupants. In various aspects, the emotional state is derived according to a learned and/or historical view of the particular occupant(s) in order to customize the determination to, for example, different sensitivities. That is, different occupants may have sensitivities to different circumstances that elevate stress. For example, less experienced drivers may not drive on highways with the same confidence as a more experienced driver. As such, the trust module 220 is able to consider these distinctions through the particular model that has learned patterns of the specific driver. Moreover, in addition to defining the emotional state, the trust module 220 can monitor changes in the emotional state. For example, the trust module 220 can monitor for an improvement in the emotional state (e.g., from worried to calm), and the trust module 220 can monitor for a decline in the emotional state (e.g., from happy to angry). As described in further detail below, the emotional state and/or the change in emotional state can indicate a change in the trust level of the occupant(s).

With continued reference to FIG. 4, in one approach, processing the data at 420 also includes identifying a trust level of the occupant(s). In one embodiment, the trust module 220 identifies the trust level after determining the baseline trust. In some instances, the trust module 220 identifies the trust level after the occupant(s) have spent some amount of time in the vehicle 100, after the vehicle 100 has started driving, and/or after the vehicle 100 has performed an automated function or another action. The trust module 220, in some instances, identifies the trust level in the same or substantially similar manner as the determination of the baseline trust. For example, the trust module 220 identifies the trust level by processing the trust data to identify a self-reported trust level of the occupant(s). In another example, the trust module 220 identifies the trust level by processing the trust data to identify an emotional state of the occupant(s). In some instances, the trust module 220 identifies a trust level that is the same as the baseline trust, higher than the baseline trust, or lower than the baseline trust.

With continued reference to FIG. 4, at 430, the trust module 220 determines whether to perform trust building. In other words, in one approach, the trust module 220 determines whether an occupant needs trust building. In some instances, when the trust level is the same or lower than the baseline trust, the trust module 220 may perform trust building. In response to identifying that the trust level is the same or lower than the baseline trust, the trust module 220, in one embodiment, identifies that the trust level satisfies a threshold, and thus may perform trust building. The determination to perform trust building is, in one approach, based, at least in part, on the occurrence of the trust level falling below the threshold, which may be defined as the baseline trust. For example, when the trust module 220 measures trust on a 1-10 scale, and the baseline trust is an 8, the trust module 220 may identify that the trust level satisfies the threshold when the measured trust level is a 5 or lower. In another example, the threshold is the occurrence of the trust level decreasing by a predetermined amount with respect to the baseline trust. For example, when the trust module 220 measures trust on a 1-10 scale, the trust module 220 may identify that the trust level satisfies the threshold when the measured trust level is 20% lower than the baseline trust.

In yet another example, the trust module 220 identifies that the trust level satisfies the threshold upon the occurrence of a takeover event. A takeover event is an instance in which an occupant takes over full control of the vehicle 100, or at least partial control of the vehicle 100, from execution of the automated function. A takeover event is a very strong indication of mistrust of the occupant(s). For example, the trust module 220 can identify that the threshold is satisfied when an occupant takes over steering of the vehicle 100 and applies the brakes, as this indicates that the occupant does not trust the automated function that the vehicle 100 is currently executing. Thus, the threshold, in at least one arrangement, can also be defined in relation to explicit actions of the occupant(s) and/or the trust module 220 can assign numeric values to the actions of the occupant(s) in order to assess the actions relative to the threshold.

In yet another example, the trust module 220 identifies that the trust level satisfies the threshold upon the occurrence of a driving event performed according to the automated function A driving event, in one approach, is a driving event that may affect the trust level of the occupant(s), for example, by lowering the trust level. A driving event can include one or more of the following executed by an automated vehicle function: driving at a rate of speed above a posted speed limit, driving at a rate of speed significantly below a posted speed limit, a near collision between the vehicle 100 and another vehicle, an object, and/or a pedestrian, ignoring a sign such as a caution sign, a slowdown sign, a yield sign, a stop sign, etc., accelerating at a high rate, and/or decelerating at a high rate, etc. Other driving events may be identified as well. In some instances, the trust module 220 processes the sensor data 250 to continuously monitor for driving events.

In one approach, the trust module 220 identifies that the trust level satisfies the threshold immediately upon the occurrence of a driving event. This approach may be advantageous when the driving event is egregious, such as a near collision. However, in instances in which the driving event is not as egregious, for example, when the driving event is accelerating at a high rate or driving at a rate of speed slightly above a posted speed limit, the trust module 220 may identify that the trust level satisfies the threshold upon the occurrence of the driving event and one or more of the following: the detection of a decline in emotional state or the detection of one or more biometric markers indicating mistrust of the occupant(s). For example, the trust module 220 may identify that the trust level satisfies the threshold when a driving event occurs, and the occupant(s) have a raised heart rate and/or exhibit an anxious emotional state.

In some instances, the trust module 220 identifies that the trust level satisfies the threshold upon a decline in emotional state of the occupant(s) irrespective of a driving event. For example, if the trust module 220 identifies that the emotional state of an occupant changed from calm to very stressed out or anxious, the trust module 220 can identify that the trust level satisfies the threshold. This approach may be advantageous as, in some instances, an occupant may lose trust in the automated vehicle function for a reason not caused by external factors or actions of the vehicle 100.

However, in some instances, the emotional state of the occupant(s) may decline because of factors not related to the automated function of the vehicle 100. For example, the emotional state of the occupant(s) may decline if the occupant(s) is feeling unwell, if they are running late to an appointment, if they are having a conversation with another occupant in the vehicle 100, etc. Accordingly, in some instances, the trust module 220 identifies that the trust level satisfies the threshold when a number of biometric markers of the occupant(s) that indicate mistrust of the automated function satisfy a multimodal threshold. Biometric markers that indicate mistrust include one or more of the following: elevated heart rate, high blood pressure, increased skin conductivity due to sweat, staring at the road, gripping the steering wheel or another component of the vehicle 100, etc. Accordingly, in one approach, when the trust module 220 identifies a certain number of these biometric markers (e.g., 3, 4, 5, etc.), the trust module 220 can identify that the occupant(s) has lost trust in the automated vehicle function and that the trust level satisfies the threshold. For example, a strong indication of mistrust may be detected when an occupant is staring at the road for a long period of time and has an elevated heart rate. While the multimodal threshold is one measure of mistrust, mistrust can also be measured according to a weighted score of biometric markers.

Referring again to FIG. 4, when the trust module 220 identifies that there is no need for trust building, the method 400 can return to 410. In some instances, the trust module 220 identifies that there is no need for trust building when the trust level does not change, does not deviate significantly from the baseline trust, increases above the baseline trust, when there is no decline in emotional state of the occupant(s), when there is no takeover event, etc.

Once the trust module 220 has identified a need for trust building using one or more of the approaches described above, the method 400 can continue to 440. At 440, in one approach, the trust module 220 determines a trust message in response to identifying that the trust level satisfies the threshold. In some instances, the trust module 220 utilizes the model(s) 280 to determine the trust message. The trust message is a message communicated to the occupant(s) in an effort to build the trust level of the occupant(s). In one approach, building the trust level means repairing the trust level back to or toward the baseline trust. However, in other instances, a trust message may be communicated to the occupant(s) irrespective of a need for trust building in an effort to bolster the trust level above the baseline trust or to raise the baseline trust itself. As described herein, the "initial" trust message is the first instance of a trust message, which can be the first trust message delivered to the occupant(s) upon entry to the vehicle 100 for the first time, upon each subsequent re-entry to the vehicle 100, when the vehicle 100 is turned on, etc.

In any case, the trust module 220, in one approach, customizes the trust message to the specific occupant(s) of the vehicle 100. More specifically, the trust module 220 can customize various aspects of the trust message to the occupant(s), for example, the content of the trust message and the manner in which the trust message is delivered. Accordingly, in one approach, the trust message has a content type and a delivery type. Each of the content type and the delivery type will be described in further detail below.

Regarding the content type, some occupants may be more receptive to different types of communication than others. For example, some occupants may prefer an apology from the vehicle 100, a technical explanation of why the vehicle 100 operated in a specific manner, a joke or a humorous message, a promise from the vehicle 100 to not make a similar driving mistake, an explanation of how the vehicle 100 is about to operate, etc. Accordingly, the content type can include one or more of the following: humorous, sympathetic, apologetic, denial, promise, technical, etc. Regarding the delivery type, some occupants may be more receptive to different manners in which the vehicle 100 delivers information. For example, some occupants may prefer an audial message or a visual message (e.g., a pictorial message, a textual message, etc.). Moreover, some occupants may prefer long, detailed messages, while other occupants prefer short and brief messages. Accordingly, the delivery type can include one or more of the following: short, long, visual, audial, pictorial, textual, etc. In some instances, a pictorial message includes a diagram, digital rendering, video, etc., explaining a driving event that just happened, a driving mistake the vehicle 100 made, etc.

In any case, the trust module 220 can determine the trust message in various manners. In one approach, the trust module 220 determines a default trust message. In one approach, a default trust message has an apologetic content type, as an apologetic trust message may prove to be effective on many types of occupant(s). Additionally, in one approach, a default trust message has an audial delivery type, as an audial delivery may be the safest manner to communicate the trust message to the occupant(s).

In another approach, the trust module 220 determines the trust message based on an occupant profile. For example, an occupant profile can include information regarding one or more preferred trust messages, including preferred content type(s) and/or delivery type(s). For example, an occupant with minimal understanding of automated vehicle functions may prefer a pictorial trust message, while an occupant with a greater understanding of automated vehicle functions may prefer a brief, audial trust message.

In another approach, the trust module 220 customizes a trust message based, at least in part, on the trust data acquired at 410 and/or the data processed at 420. More specifically, in some instances, the trust module 220 customizes a trust message based, at least in part, on one or more biometric markers of the occupant(s), one or more emotional states of the occupant(s), vehicle data, and/or environment data. In one example, if the trust module 220 detects that a biometric marker of an occupant indicates that the occupant is young, the trust module 220 may determine that a pictorial trust message is suitable. In another example, if the trust module 220 detects that the emotional state of an occupant is angry, an apologetic trust message may be suitable. In another example, if the trust module 220 detects that the emotional state of an occupant is confused, an explanatory trust message may be suitable. In yet another example, if the vehicle data indicates that the vehicle 100 is parked, a pictorial trust message may be suitable, while an audial trust message may be more suitable when the vehicle data indicates that the vehicle 100 is in motion. Finally, in yet another example, if the environment data indicates that the vehicle 100 is traveling in a very loud area such as a city, the trust module 220 may determine that a textual trust message is more suitable than an audial one.

In yet another approach, the trust module 220 determines the trust message based on the baseline trust level. For example, an occupant with a higher baseline trust level may not need as strong of a trust message, while an occupant with a lower baseline trust level may need a stronger trust message, such as an apology. In any case, in some instances, the trust module 220 utilizes the models 280 to determine the trust message based on the sensor data 250, the occupant profile data 260, the occupant input data 270, etc.

With continued reference to FIG. 4, once the trust module 220 has determined the trust message, at 450, in one approach, the delivery module 230 delivers the trust message to the occupant(s). In various embodiments, delivering the trust message may involve different actions on the part of the delivery module 230. For example, the delivery module 230 may deliver the trust message using an output system 135 of the vehicle 100. The output system 135 may deliver the trust message audially through a sound system of the vehicle 100 and/or visually (e.g., textually or pictorially) through the input system 130 and/or a heads-up display (HUD) of the vehicle 100. Additionally or alternatively, the delivery module 230 delivers the trust message to one or more mobile devices or personal electronic devices of the occupant(s). In yet another example, the delivery module 230 delivers the trust message in augmented reality.

In some instances, the delivery module 230 delivers the trust message based on the passenger compartment data and/or the vehicle data, as described above. More specifically, the delivery module 230 can deliver the trust message based on where the occupant(s) are located within the vehicle 100, lighting conditions within the passenger compartment, a state of the vehicle 100, etc. For example, if a target occupant of the trust message is sitting in the driver seat of the vehicle 100, it may not be suitable to deliver a pictorial trust message, but rather, it may be advantageous to deliver an audial trust message. In any case, after delivery of the trust message, the method 400 may return to 410. In this way, the trust system 170 continually monitors the trust level of the occupant(s) and delivers trust messages as needed.

However, in some instances, upon the delivery of the trust message, the trust level of the occupant(s) may or may not be influenced. Ideally, the trust level will increase back toward the baseline trust, or the baseline trust will be fully restored, or the trust level will increase above the baseline trust. However, in other instances, the trust level may remain the same (e.g., unchanged by the trust message), or the trust level may be further lowered by the trust message. In other words, it is possible that the trust message caused the occupant(s) to further lose trust in the automated vehicle function. Accordingly, FIG. 5 illustrates another flowchart of a method 500 that is associated with additional aspects of trust building, specifically, additional trust building after delivery of a trust message.

Figure 5:
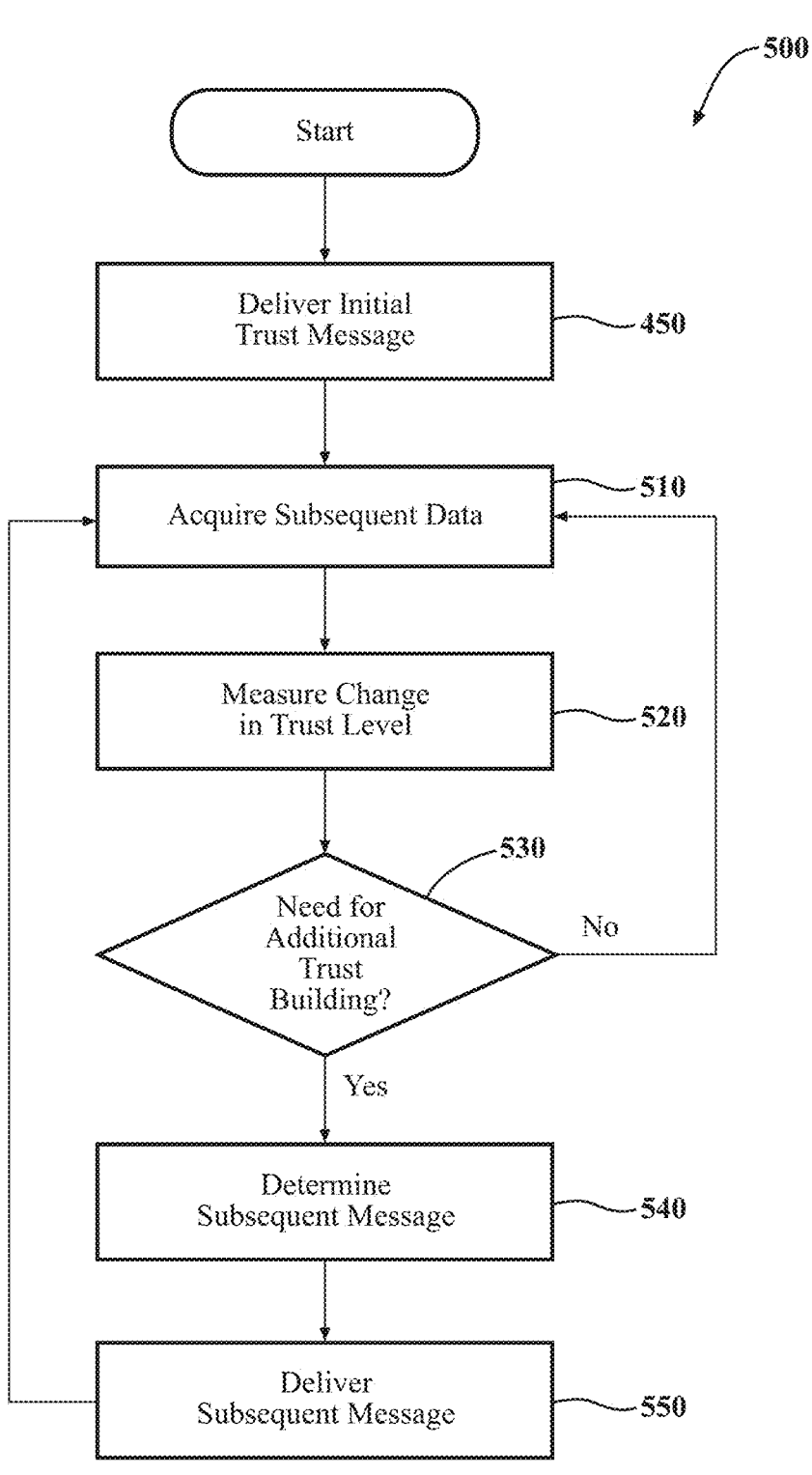
FIG. 5 illustrates a flowchart for another example of a method that is associated with building trust within occupant(s) of a vehicle.

Turning now to FIG. 5, the method 500 will be discussed from the perspective of the trust system 170 of FIGS. 1 and 2. While the method 500 is discussed in connection with the trust system 170, it should be appreciated that the method 500 is not limited to being implemented within the trust system 170 but that the trust system 170 is instead one example of a system that may implement the method 500.

At 450, as described above in connection with FIG. 4, the delivery module 230 delivers a trust message. The actions performed by the delivery module 230 at 450, in one implementation, are the same as or substantially similar to the actions described above in connection with FIG. 4. Continuing with FIG. 5, at 510, the trust module 220 acquires subsequent data. The subsequent data acquired can include the same or substantially similar data that the trust module acquires at 410 of FIG. 4. Additionally, at 510, the subsequent data includes, in one embodiment, the trust message itself, including the content type and delivery type of the trust message delivered at 450. Moreover, the subsequent data includes, in one approach, the response of the occupant(s) to the trust message delivered at 450. For example, subsequent data regarding the response of the occupant(s) to the trust message can include changes in biometric markers (including gaze markers) and/or changes in emotional state after the trust message is delivered. For example, in some instances, the trust message may cause the occupant(s) to trust the automated vehicle function more, and thus become calmer. Furthermore, the subsequent data can include additional occupant profile data, for example, historical data regarding previous trust messages delivered to an occupant and the occupant's response to those previous trust messages (e.g., a trust building history). The trust building history can be stored in the data store 240 of the vehicle 100 or can even be imported from another vehicle. In one approach, the trust module 220 uses the subsequent data acquired at 510 to further improve trust building with the occupant(s).

At 520, in one approach, the trust module 220 measures a change in the trust level of the occupant(s) based, at least in part, on the subsequent data. For example, the trust module 220 measures a change in the trust level of the occupant(s) based, at least in part, on the response of the occupant(s) to the trust message. In one embodiment, the trust module 220 measures a change in the trust level using the same or substantially similar approach as described in connection above with 420. For example, more specifically, the trust module 220 at 520 processes the subsequent data to determine the trust level of the occupant(s), and then compares this trust level with the previously determined trust level. In other words, the trust module 220 processes the subsequent data to identify that the trust level satisfies a threshold.

Measuring the change in trust level can occur in various manners. In one example, the trust module 220 receives a subsequent input from the occupant(s) to the input system 130 indicating an updated trust level after an initial input indicating an initial trust level. In another example, the trust module 220 estimates the change in trust level based on the sensor data 250. For example, the trust module 220 can continuously monitor for and estimate the emotional state of the occupant(s). A changed emotional state can indicate a change in trust level. Accordingly, at 520, the trust module 220 can identify if there was an increase in the trust level, no change in the trust level, or a decrease in the trust level.

The method 500 can then proceed to 530. At 530, in one embodiment, the trust module 220 identifies if there is a need for additional trust building. At 530, in one approach, the trust module 220 determines there is no need for additional trust building when the trust level increased sufficiently in response to the trust message. In one instance, "sufficiently" means that the baseline trust was restored or that the trust level increased to a level within about 10% of the baseline trust. In another approach, at 530, the trust module 220 determines there is a need for additional trust building when there was no change in the trust level, when there was a decrease in the trust level, or when the increase in the trust level was insufficient. If the trust module 220 determines that there is no need for additional trust building, the method 500 can return to 510. If the trust module 220 determines that there is a need for additional trust building, the method can proceed to 540.

At 540, the trust module 220, in one approach, determines a subsequent message to be delivered to the occupant(s) in an effort to build the trust level. The subsequent message can be a modified version of the trust message, or the subsequent message can be an entirely new trust message. In one embodiment, the trust module 220 determines the subsequent message based on the subsequent data and/or the changed trust level.

In some instances, the trust module 220 customizes the content type and/or the delivery type of the subsequent message based on the subsequent data. For example, in one approach, the trust module 220 trains one or more of the model(s) 280 to predict the content type and/or the delivery type based on the subsequent data. For example, if the trust message was a humorous trust message, and the subsequent data indicates that the occupant(s) was confused by the trust message, the trust module 220 can predict that the subsequent message should have a different content type, such as an apology or an explanation. In another example, if the trust message was an audial message, and the subsequent data indicates that the occupant(s) was startled by the audial message, the trust module 220 can predict that the subsequent message should have a different delivery type, such as textual.

Upon determining the subsequent message at 540, the method can proceed to 550, in which the delivery module 230 delivers the subsequent message. The delivery module 230, in some instances, delivers the subsequent message in the same or substantially similar manner as described above in connection with 450 of FIG. 4. In some instances, though, delivering the subsequent message includes waiting a predetermined amount of time before delivering the subsequent message. In some instances, trust messages delivered repeatedly in rapid succession may actually have an opposite effect on the trust level of the occupant(s) than desired. For example, an occupant who has received multiple trust messages in rapid succession may infer that the trust system 170 is malfunctioning, that the trust system 170 cannot actually determine a suitable trust message for the occupant, or that the automated vehicle function is not working properly. Accordingly, the delivery module 230 can wait a predetermined amount of time before delivering the subsequent message. The predetermined amount of time can be a few seconds, a few minutes, or another predetermined amount of time.

After delivering the subsequent message, the method 500 can return to 510, and the method 500 can continually repeat. Upon repeating the method 500, at 510, the trust module 220 can further acquire historical data regarding previously delivered trust messages. In some instances, when multiple trust messages are unsuccessful (e.g., without building the trust of the occupant(s)), stronger trust messages may be needed to restore the baseline trust level. For example, if the trust module 220 detects frequent takeover events by an occupant, and previous trust messages were apologetic but unsuccessful, the trust module 220 may determine that a stronger content type may be needed, such as an explanation of why the vehicle 100 is operating in a specific manner and why the occupant does not need to take over control from the automated vehicle function.

Figure 6:
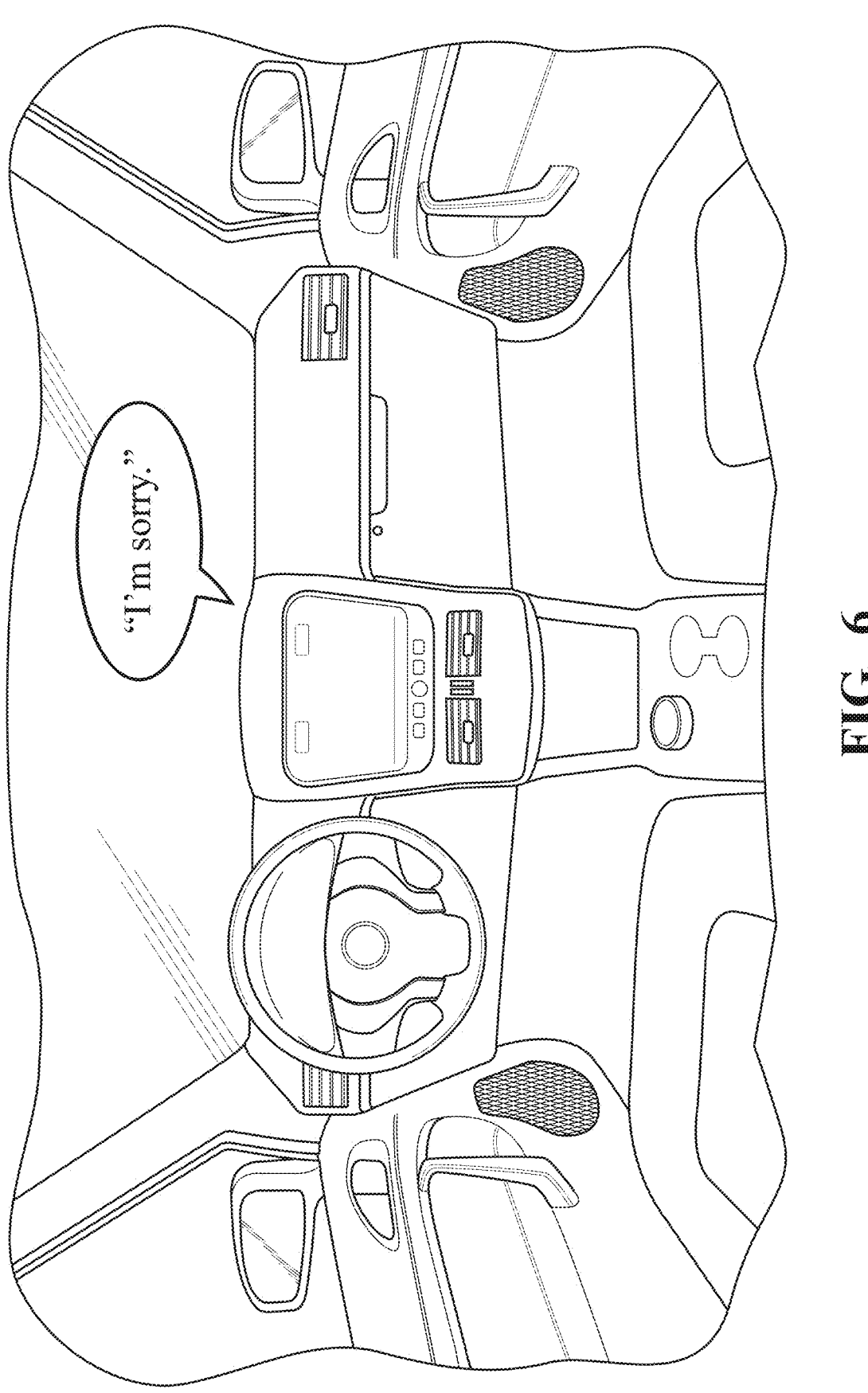
FIG. 6 illustrates one example of a trust message that is directed to building trust within occupant(s) of a vehicle.

Turning now to FIG. 6, an illustrative example of a trust message is shown. As shown in FIG. 6, the example trust message is an apology by the vehicle 100. For example, upon the identification of a need for trust building, the trust module 220 can determine a trust message in which the content type is an apology, and the delivery type is audial. Accordingly, the delivery module 230 can cause the output system 135 of the vehicle 100 (e.g., one or more speakers in the passenger compartment) to audially state "I'm sorry" to the occupant(s).

FIG. 1 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100.

With continued reference to the various components illustrated in FIG. 1, the vehicle 100 includes one or more processors 110. In one or more arrangements, the processor(s) 110 can be a primary/centralized processor of the vehicle 100 or may be representative of many distributed processing units. For instance, the processor(s) 110 can be an electronic control unit (ECU). Alternatively, or additionally, the processors include a central processing unit (CPU), a graphics processing unit (GPU), an ASIC, a microcontroller, a system on a chip (SoC), and/or other electronic processing units that support operation of the vehicle 100.

The vehicle 100 can include one or more data stores 115 for storing one or more types of data. The data store 115 can be comprised of volatile and/or non-volatile memory. Examples of memory that may form the data store 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 115 is a component of the processor(s) 110. The data store 115 is operatively connected to the processor(s) 110 for use thereby. The term "operatively connected," as used throughout this description, can include direct or indirect connections, including connections without direct physical contact.

In one or more arrangements, the one or more data stores 115 include various data elements to support functions of the vehicle 100, such as semi-autonomous and/or autonomous functions. Thus, the data store 115 may store map data 116 and/or sensor data 119. The map data 116 includes, in at least one approach, maps of one or more geographic areas. In some instances, the map data 116 can include information about roads (e.g., lane and/or road maps), traffic control devices, road markings, structures, features, and/or landmarks in the one or more geographic areas. The map data 116 may be characterized, in at least one approach, as a high-definition (HD) map that provides information for autonomous and/or semi-autonomous functions.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. In one or more arrangements, the map data 116 includes one or more static obstacle maps 118. The static obstacle map(s) 118 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 119 is data provided from one or more sensors of the sensor system 120. The sensor data 119 may include observations of a surrounding environment of the vehicle 100 and/or information about the vehicle 100 itself. In some instances, one or more data stores 115 located onboard the vehicle 100 store at least a portion of the map data 116 and/or the sensor data 119. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 120 and/or the one or more sensors can be operatively connected to the processor(s) 110, the data store(s) 115, and/or another element of the vehicle 100.

Various examples of different types of sensors will be described herein. However, it will be understood that the embodiments are not limited to the particular sensors described. In various configurations, the sensor system 120 includes one or more vehicle sensors 121 and/or one or more environment sensors. The vehicle sensor(s) 121 function to sense information about the vehicle 100 itself. In one or more arrangements, the vehicle sensor(s) 121 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 120 can include one or more environment sensors 122 that sense a surrounding environment (e.g., external) of the vehicle 100 and/or, in at least one arrangement, an environment of a passenger cabin of the vehicle 100. For example, the one or more environment sensors 122 sense objects the surrounding environment of the vehicle 100. Such obstacles may be stationary objects and/or dynamic objects. Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 includes one or more radar sensors 123, one or more LIDAR sensors 124, one or more sonar sensors 125 (e.g., ultrasonic sensors), and/or one or more cameras 126 (e.g., monocular, stereoscopic, RGB, infrared, etc.).

Continuing with the discussion of elements from FIG. 1, the vehicle 100 can include an input system 130. The input system 130 generally encompasses one or more devices that enable the acquisition of information by a machine from an outside source, such as an operator. The input system 130 can receive an input from a vehicle passenger (e.g., a driver/operator and/or a passenger). Additionally, in at least one configuration, the vehicle 100 includes an output system 135. The output system 135 includes, for example, one or more devices that enable information/data to be provided to external targets (e.g., a person, a vehicle passenger, another vehicle, another electronic device, etc.).

Furthermore, the vehicle 100 includes, in various arrangements, one or more vehicle systems 140. Various examples of the one or more vehicle systems 140 are shown in FIG. 1. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 141, a braking system 142, a steering system 143, a throttle system 144, a transmission system 145, a signaling system 146, and a navigation system 147.

The navigation system 147 can include one or more devices, applications, and/or combinations thereof to determine the geographic location of the vehicle 100 and/or to determine a travel route for the vehicle 100. The navigation system 147 can include one or more mapping applications to determine a travel route for the vehicle 100 according to, for example, the map data 116. The navigation system 147 may include or at least provide connection to a global positioning system, a local positioning system or a geolocation system.

In one or more configurations, the vehicle systems 140 function cooperatively with other components of the vehicle 100. For example, the processor(s) 110, the trust system 170, and/or automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the navigation and/or maneuvering of the vehicle 100. The processor(s) 110, the trust system 170, and/or the automated driving module(s) 160 may control some or all of these vehicle systems 140.

For example, when operating in the autonomous mode, the processor(s) 110, the trust system 170, and/or the automated driving module(s) 160 control the heading and speed of the vehicle 100. The processor(s) 110, the trust system 170, and/or the automated driving module(s) 160 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, in one configuration, the vehicle 100 includes one or more actuators 150. The actuators 150 are, for example, elements operable to move and/or control a mechanism, such as one or more of the vehicle systems 140 or components thereof responsive to electronic signals or other inputs from the processor(s) 110 and/or the automated driving module(s) 160. The one or more actuators 150 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory computer-readable instructions that, when executed by the processor 110, implement one or more of the various functions described herein. In various arrangements, one or more of the modules are a component of the processor(s) 110, or one or more of the modules are executed on and/or distributed among other processing systems to which the processor(s) 110 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 160. The automated driving module(s) 160, in at least one approach, receive data from the sensor system 120 and/or other systems associated with the vehicle 100. In one or more arrangements, the automated driving module(s) 160 use such data to perceive a surrounding environment of the vehicle. The automated driving module(s) 160 determine a position of the vehicle 100 in the surrounding environment and map aspects of the surrounding environment. For example, the automated driving module(s) 160 determines the location of obstacles or other environmental features including traffic signs, trees, shrubs, neighboring vehicles, pedestrians, etc.

The automated driving module(s) 160 either independently or in combination with the trust system 170 can be configured to determine travel path(s), current autonomous driving maneuvers for the vehicle 100, future autonomous driving maneuvers and/or modifications to current autonomous driving maneuvers based on data acquired by the sensor system 120 and/or another source. In general, the automated driving module(s) 160 functions to, for example, implement different levels of automation, including advanced driving assistance (ADAS) functions, semi-autonomous functions, and fully autonomous functions, as previously described.

The arrangements disclosed herein provide the benefit of building trust of one or more occupants of a vehicle in an automated function of the vehicle. Moreover, the arrangements disclosed herein provide the benefit of building trust in a manner that is customized to the occupant(s) so that efforts to build trust are more successful. As a result, the occupant(s) may have a safer and more comfortable ride in the vehicle.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing.

Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some examples, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor;

a memory communicably coupled to the processor and storing a trust module including instructions that, when executed by the processor, cause the processor to:

acquire trust data regarding an automated function of a vehicle, an external environment of the vehicle, and an occupant of the vehicle;

process the trust data to determine a baseline trust of the occupant in the automated function executing an action for the vehicle;

identify a trust level of the occupant;

determine, based, at least in part, on the trust data and in response to identifying that the trust level satisfies a threshold, a trust message and a content type and a delivery type of the trust message; and deliver the trust message to the occupant.

2. The system of claim 1, wherein the instructions to identify that the trust level satisfies the threshold include instructions to identify a takeover event in which the occupant takes over at least partial control of the vehicle from execution of the automated function.

3. The system of claim 1, wherein the instructions to acquire the trust data include instructions to acquire biometric markers of the occupant that indicate mistrust of the automated function, and wherein the instructions to identify that the trust level satisfies a threshold include instructions to determine that the trust level satisfies an action threshold defined by the baseline trust, including instructions to determine whether a number of the biometric markers satisfy a multimodal threshold.

4. The system of claim 1, wherein a default content type is an apology, wherein a default delivery type is audial, and wherein the instructions further include instructions to customize the content type and the delivery type based on the trust data and subsequent data regarding a response of the occupant to the trust message.

5. The system of claim 1, wherein the instructions to determine the trust message include instructions to process the trust data using a model that is a machine learning model.

6. The system of claim 1, wherein the instructions to deliver the trust message include instructions to deliver the trust message after a predetermined amount of time has passed, and wherein the instructions further include instructions to:

measure, based, at least in part, on subsequent data regarding a response of the occupant to the trust message, a change in the trust level, and wherein the instructions to identify that the trust level satisfies the threshold include instructions to measure no change in the trust level or a decrease in the trust level.

7. A non-transitory computer-readable medium including instructions that, when executed by a processor, cause the processor to:

acquire trust data regarding an automated function of a vehicle, an external environment of the vehicle, and an occupant of the vehicle;

process the trust data to determine a baseline trust of the occupant in the automated function executing an action for the vehicle;

identify a trust level of the occupant;

determine, based, at least in part on, the trust data and in response to identifying that the trust level satisfies a threshold, a trust message and a content type and a delivery type of the trust message; and deliver the trust message to the occupant.

8. The non-transitory computer-readable medium of claim 7, wherein the instructions to identify that the trust level satisfies the threshold include instructions to identify a takeover event in which the occupant takes over at least partial control of the vehicle from execution of the automated function.

9. The non-transitory computer-readable medium of claim 7, wherein the instructions to acquire the trust data include instructions to acquire biometric markers of the occupant that indicate mistrust of the automated function, and wherein the instructions to identify that the trust level satisfies a threshold include instructions to determine that the trust level satisfies an action threshold defined by the baseline trust, including instructions to determine whether a number of the biometric markers satisfy a multimodal threshold.

10. The non-transitory computer-readable medium of claim 7, wherein a default content type is an apology, wherein a default delivery type is audial, and wherein the instructions further include instructions to customize the content type and the delivery type based on the trust data and subsequent data regarding a response of the occupant to the trust message.

11. The non-transitory computer-readable medium of claim 7, wherein the instructions to determine the trust message include instructions to process the trust data using a model that is a machine learning model.

12. The non-transitory computer-readable medium of claim 7, wherein the instructions to deliver the trust message include instructions to deliver the trust message after a predetermined amount of time has passed, and wherein the instructions further include instructions to:

measure, based, at least in part, on subsequent data regarding a response of the occupant to the trust message, a change in the trust level, and wherein the instructions to identify that the trust level satisfies the threshold include instructions to measure no change in the trust level or a decrease in the trust level.

13. A method, comprising:

acquiring trust data regarding an automated function of a vehicle, an external environment of the vehicle, and an occupant of the vehicle;

processing the trust data to determine a baseline trust of the occupant in the automated function executing an action for the vehicle;

identifying a trust level of the occupant;

determining, based, at least in part, on the trust data and in response to identifying that the trust level satisfies a threshold, a trust message and a content type and a delivery type of the trust message; and delivering the trust message to the occupant.

14. The method of claim 13, wherein identifying that the trust level satisfies the threshold includes identifying a takeover event in which the occupant takes over at least partial control of the vehicle from execution of the automated function.

15. The method of claim 13, wherein acquiring the trust data includes acquiring biometric markers of the occupant that indicate mistrust of the automated function, and wherein identifying that the trust level satisfies a threshold includes determining that the trust level satisfies an action threshold defined by the baseline trust, including determining whether a number of the biometric markers satisfy a multimodal threshold.

16. The method of claim 13, wherein a default content type is an apology, wherein a default delivery type is audial, and further comprising: customizing the content type and the delivery type based on the trust data and subsequent data regarding a response of the occupant to the trust message.

17. The method of claim 13, wherein determining the trust message further includes processing the trust data using a model that is a machine learning model.

18. The method of claim 13, further comprising:

acquiring subsequent data regarding delivery of the trust message, the subsequent data including the content type and the delivery type of the trust message and a response of the occupant to the trust message; and based, at least in part, on the subsequent data, training a model to predict a content type and a delivery type of a subsequent message.

19. The method of claim 13, wherein delivering the trust message includes delivering the trust message after a predetermined amount of time has passed, and further comprising:

measuring, based, at least in part, on subsequent data regarding a response of the occupant to the trust message, a change in the trust level, and wherein identifying that the trust level satisfies the threshold includes measuring no change in the trust level or a decrease in the trust level.

20. The method of claim 19, wherein processing the trust data to determine the baseline trust includes identifying an initial input, by the occupant to a user interface of the vehicle, that indicates the baseline trust, and wherein measuring the change in the trust level includes identifying a subsequent input, by the occupant to the user interface, that indicates a changed trust level.

\* \* \* \* \*